UNITED STATES PATENT OFFICE.

NATHAN ROSEWATER, OF CLEVELAND, OHIO.

DECAFFEINATED COFFEE.

1,016,294.   Specification of Letters Patent.   Patented Feb. 6, 1912.

No Drawing.   Application filed March 29, 1911. Serial No. 617,681.

*To all whom it may concern:*

Be it known that I, NATHAN ROSEWATER, a citizen of the United States, residing at Cleveland, in the county of Cuyahoga and State of Ohio, have invented a certain new and useful Improvement in Decaffeinated Coffee and Processes of Producing the Same, of which the following is a full, clear, and exact description.

The primary object of my invention is to substantially eliminate caffein or xanthin bases or salts as constituents of natural coffee beans and other natural beans containing the same, without using chemicals or solvents other than water in the process, and to produce a purified product which will greatly resemble the natural beans, and from which product, after grinding, or roasting and grinding, one may make, by the usual methods, but in a shorter time, a beverage which can scarcely be distinguished by its aroma, taste and appearance from that made from the natural roasted bean commonly used for this purpose.

In carrying out my invention the green beans, preferably, (although roasted beans can also be used) are macerated in cold water at a temperature close to the freezing point,—as for example, between 33° and 45° F. The temperature of the water and the length of time employed for maceration may be varied, as may also the number of times the beans should be macerated in fresh relays of water, depending upon the character of the bean employed, and upon the completeness with which the solution of extractives has proceeded. The result of this treatment is to remove from the beans and to form therefrom an extract of those constituents of the beans which are soluble in cold water, consisting of tannin, sugars and mucilaginous substances, etc., and only negligible traces of caffein or other xanthin constituents. The beans are next macerated in hot water, kept as near as possible to a temperature of 212° F. This step may be repeated for any number of times, and each maceration may be continued for any suitable length of time, depending upon the completeness with which one desires to remove the caffein and other xanthin constituents which are soluble in hot water. And moreover it should be carried on until the beans are denuded of their thin cover skin. The hot water, after the beans have been macerated in it, will be a weak extract of caffein and other xanthin constituents, together with small quantities of tannic acid, sugars and mucilage. The beans being segregated from the water are sufficiently dried; and upon them is added a more or less concentrated solution made by evaporating the first or the first one or two cold water extracts previously formed, as above described. This concentrated extract will be uniformly absorbed into and be deposited over the surface of the beans. The beans are then dried, and the product, as a commercial product, is completed. It may, thereafter, be roasted just as untreated beans are, and the roasted product may be ground, and a beverage made from the ground product.

The product which results in the carrying on of the above named process, ending with, as the final step, the drying of the beans, will greatly resemble natural beans, but will have been deprived of practically all of their xanthin alkaloids, but will have had restored to them in different positional relation to the structure of the bean, but in unaltered chemical condition, substantially all of those constituents which were removed by cold water. The dried beans—the finished product, will have a glazed appearance produced by the dried coating of the cold water extractives; and this will be still more noticeable after roasting. This coating also serves to seal more or less completely into the bean the aromatic and volatile constituents which have not been removed, or are formed by roasting.

Example: If we start with 101 pounds of green, whole Java coffee beans, one pound of this may be taken and assayed after being finely ground. The assay will show about one per cent. of caffein and fifteen per cent. of total water soluble extractives. The remaining 100 pounds of whole beans are placed in a suitable containing vessel to which is added about 150 pints of cold water at a temperature of 33° to 42° F., and this is kept by suitable means at this temperature, and the mass slowly and carefully stirred while the maceration proceeds. The beans immediately begin to absorb the water and to swell until in about three or four hours they will have absorbed about one hundred pints of water and have swollen into over double their original size. After this maceration has been allowed to proceed for about twelve hours, more or less, and when the liquid ceases to show any substantial gain in specific gravity, the fluid is drained from the beans, and enough more of the cold water is added to again fully cover the swollen beans, which will require about one-hundred and eighty pints. The maceration is allowed to proceed as before, after which the second fluid is drained from the beans. The first extract will contain about fifty per cent. of the cold water soluble extractions. The second extract about thirty per cent. more. If a third cold water maceration was carried on about ten per cent. more would be extracted which would make a total of ninety per cent. of the cold water soluble constituents removed by these several macerations in cold water. These first three macerations, however, will contain only a very small and almost negligible percentage of caffein or other xanthin alkaloids,—this, because those substances are almost insoluble in water at the temperature specified. If, however, it is desired to remove from these cold water extracts such small amount of caffein and other xanthin alkaloids as may have been dissolved therein the extracts may be evaporated at a temperature of about 212° F. until a concentrated solution is formed which, at the temperature of 33° to 42° F. it has about the consistency of honey or syrup. This solution will, on standing half an hour, more or less, at the low temperature stated, separate the caffein and other xanthin alkaloids out of the solution and the liquid can be filtered so as to free it from such substances. Of course, one might use any of several other well known methods of removing the small quantity of caffein and other xanthin alkaloids from the cold water solution instead of the method stated.

The beans being segregated from the cold water are now macerated with large volumes, say one-thousand pints of hot water at about 210° F. After standing in this water for three hours, more or less, the water may be drained off and thrown away and fresh hot water added, and the beans allowed to macerate therein. This may be repeated as many times as desired. The hot water solutions thus obtained will contain caffein and other xanthin alkaloids, but only small negligible quantities of those substances which are soluble in cold water. During each hot water maceration approximately one-tenth of the caffein and other xanthin alkaloids will be removed. It follows, therefore, that about ten of these macerations will have practically eliminated the caffein and other xanthin alkaloids from the beans. The proportion of these substances in each hot water charge is so slight that it is not thought that it will be practically worth while to attempt to save and recover them. These hot water extracts may, therefore, be thrown away. These hot water extracts also contain so small a proportion of the constituents which are soluble in cold water that it is not worth while to save them. About 90 per cent. of such constituents recovered by three cold water macerations is thought to be sufficient for practical purposes, and all that practically it will pay to try to save.

During the repeated macerations of the beans in hot water the delicate skin covering the substances of the beans will have been swollen, loosened and shed, and the bean, on magnified inspection, will be found to be denuded, and therefore distinguishable from natural or unaltered beans, although the gross appearance will not appear to be changed.

The beans, after the described treatment, are drained and subjected to a drying process. When sufficiently dried, they are to be covered by a concentrated solution of the cold water extracts,—said solution being concentrated until it has about the consistency of honey or syrup. The dried beans will uniformly absorb this concentrated solution, whereby it again becomes a constituent part of the beans, except that the removed substances will occupy different positional relations to the cellular and other component elements of the bean, especially the fats which have not been removed and have not had their original positions altered. The chemical composition of the substances removed by the cold water and restored to the beans, as above stated, have not, however, been changed. Finally the beans are to be dried.

While the beans are being caused to absorb the cold water extractives, much of the latter will be deposited upon the surface of the beans. When the dried beans are subsequently roasted, the beans will acquire a glazed appearance due to the caramelizing during the roasting process of the sugar, dextrin, etc., deposited on the surface of the beans. This seals the pores of the beans, so as to prevent any substantial escape of the aromas or other volatile constituents which the beans now carry.

The hereinbefore described process has probably its greatest commercial value when employed to de-caffeinate coffee beans. There are, however, other natural beans which are commonly employed in making beverages to which the same treatment may be applied, with the same result of eliminating therefrom a very large percentage of the caffein or other xanthin bases or salts.

Having described my invention, I claim:

1. The described process of purifying vegetable beans containing caffein and other xanthin alkaloids, which consists in first macerating said beans in very cold water to form a cold water extract of those constituents of the beans which will be dissolved in very cold water; second, in subsequently macerating said beans in hot water to form hot water extract of such remaining constituents of the beans as will dissolve in hot water; and in then restoring said cold water extractives to said beans in altered positional relations but in unaltered chemical condition.

2. The described process of treating vegetable beans containing caffein and other xanthin alkaloids, which consists in first macerating the beans in very cold water, thereby producing a cold water extract of such of the ingredients of the beans as will be dissolved by said very cold water; in subsequently macerating said beans in hot water, thereby producing an extract of caffein and other xanthin alkaloids and such other substances remaining in the beans as will be dissolved by such hot water, and in continuing the hot water macerations until the beans have been denuded of their external skin; in concentrating the cold water extract; in drying the beans and immersing them in said concentrating cold water extract and allowing the dried beans to absorb the same; and in finally drying said beans, substantially as specified.

3. The described process of treating vegetable beans containing caffein and other xanthin alkaloids, which consists in repeatedly macerating the beans in very cold water, thereby producing cold water extracts of such of the ingredients of the beans as will be dissolved by very cold water; in subsequently repeatedly macerating the said beans in hot water, thereby producing extracts of caffein and other xanthin alkaloids and such other substances remaining in the beans which will dissolve in hot water, and in continuing this hot water maceration until the beans have been denuded of their external skin; in drying the beans; in concentrating some of the first produced cold water extracts to about the consistency of honey; in immersing the dried bean in this concentrated cold water extract, whereby the same will be absorbed into and upon the beans; and in finally drying said beans, substantially as specified.

4. As a new product (article of manufacture) whole vegetable beans which have been denuded of their outer cover skin and from which much of the extractives soluble in both cold water and in hot water have been removed, and to which the extractives soluble in very cold water only have been restored in unaltered chemical condition,—said extractives being absorbed into and deposited upon the denuded surface of said beans to form a sealing glaze.

In testimony whereof, I hereunto affix my signature in the presence of two witnesses.

NATHAN ROSEWATER.

Witnesses:
H. R. SULLIVAN,
A. F. KWIS.